Feb. 22, 1938.  F. V. WALTZ  2,109,001
WEIGHING SCALE
Filed Feb. 25, 1936  4 Sheets-Sheet 1
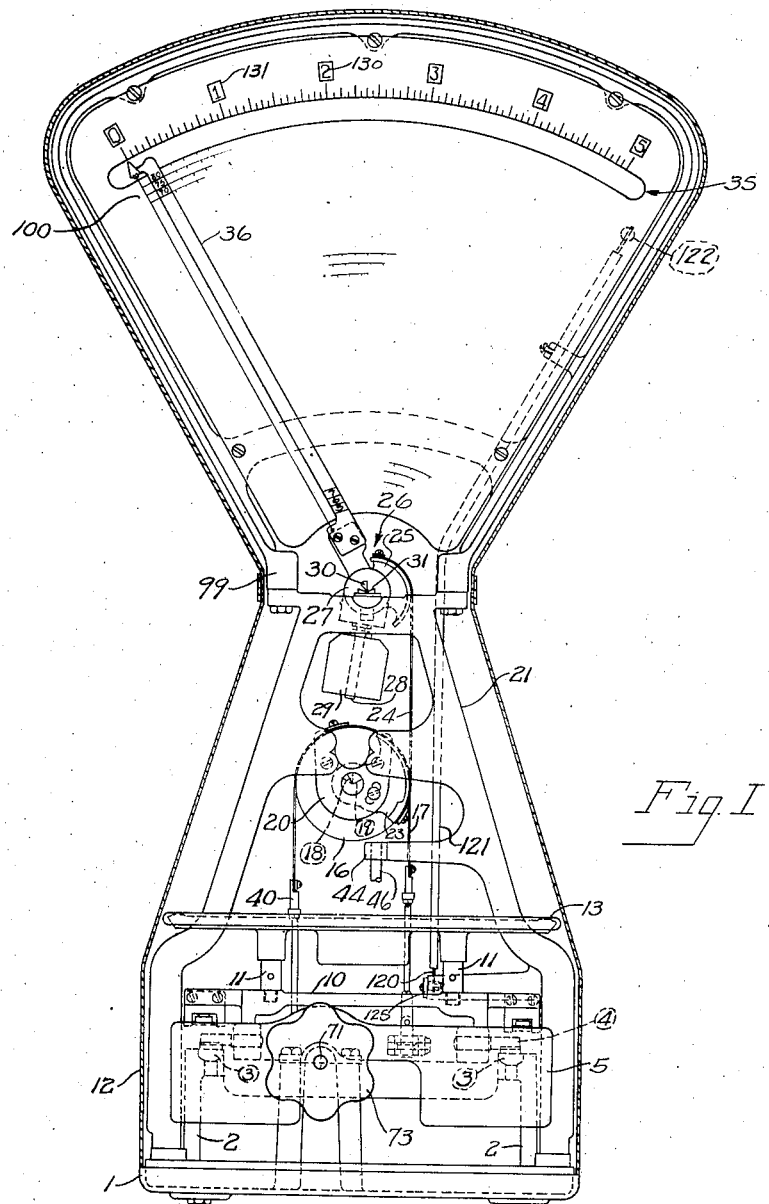
Fig. I
Foster V. Waltz
INVENTOR
BY [signature] Marshall
ATTORNEY

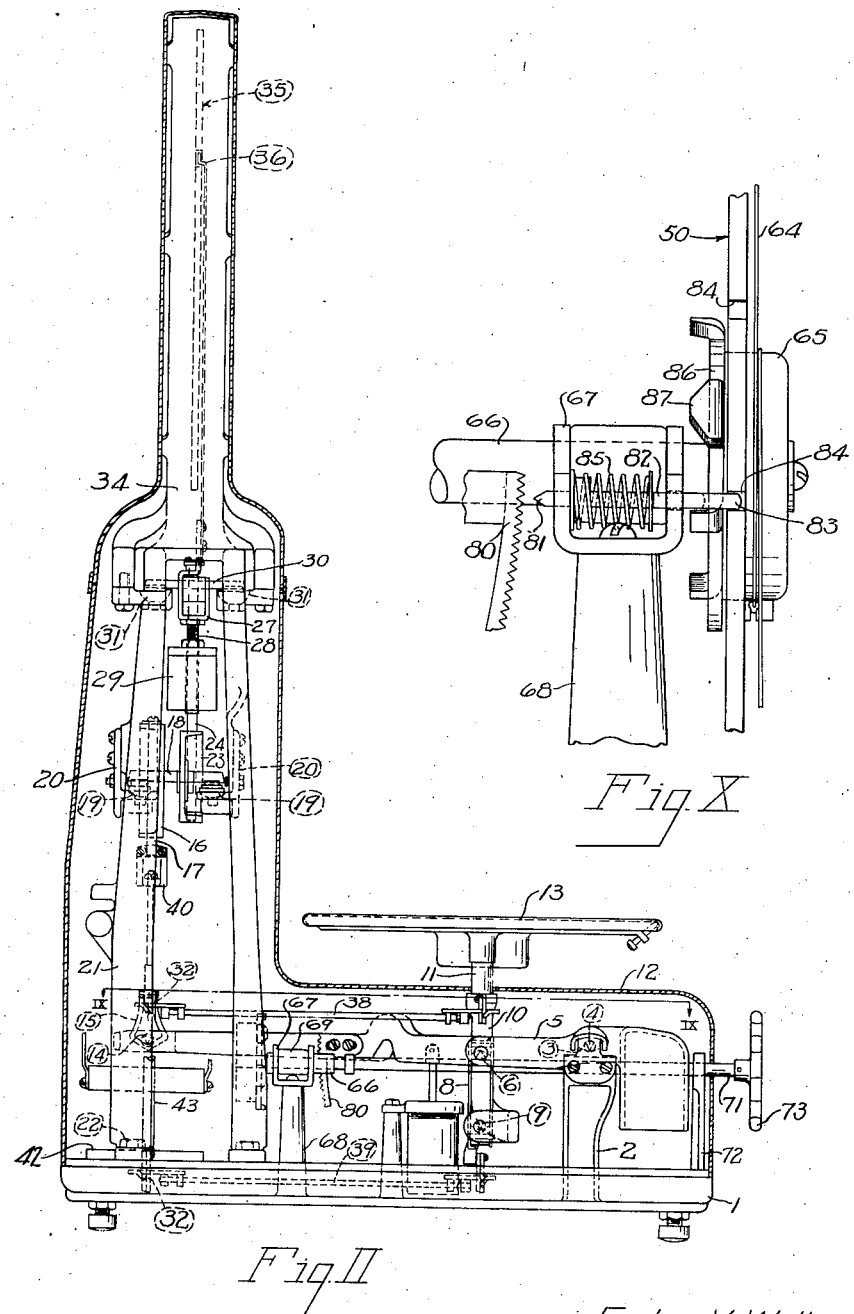

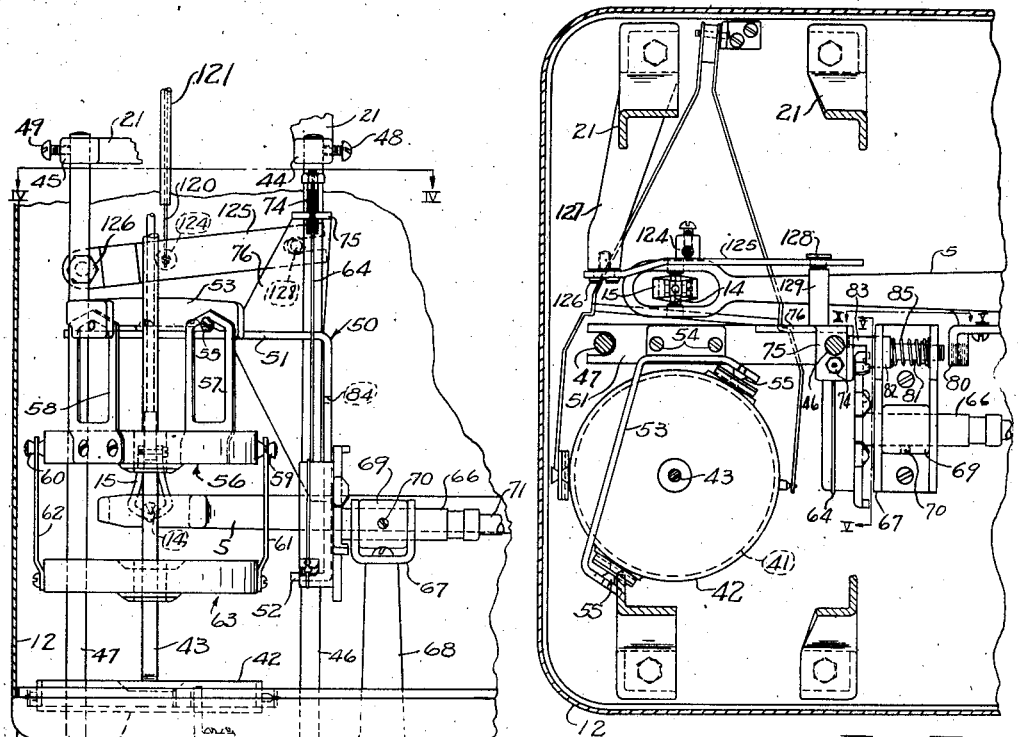
Fig. III        Fig. IV
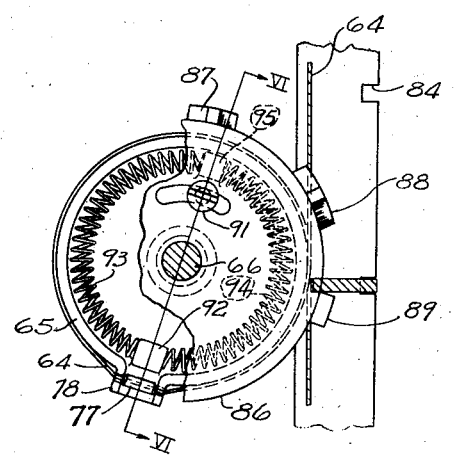
Fig. V
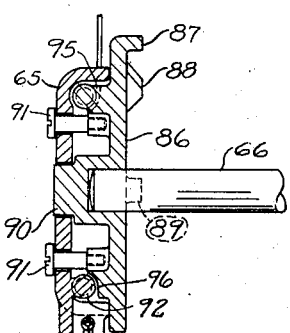
Fig. VI
Foster V. Waltz
INVENTOR Feb. 22, 1938.     F. V. WALTZ     2,109,001
WEIGHING SCALE
Filed Feb. 25, 1936     4 Sheets-Sheet 4
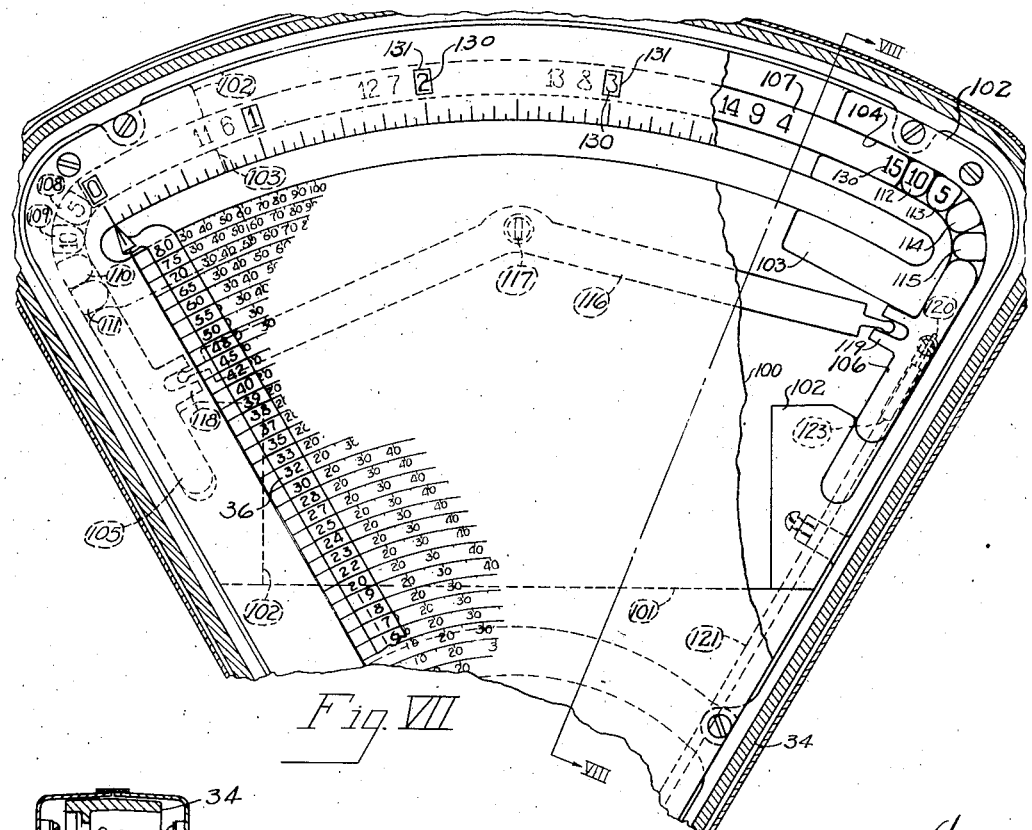
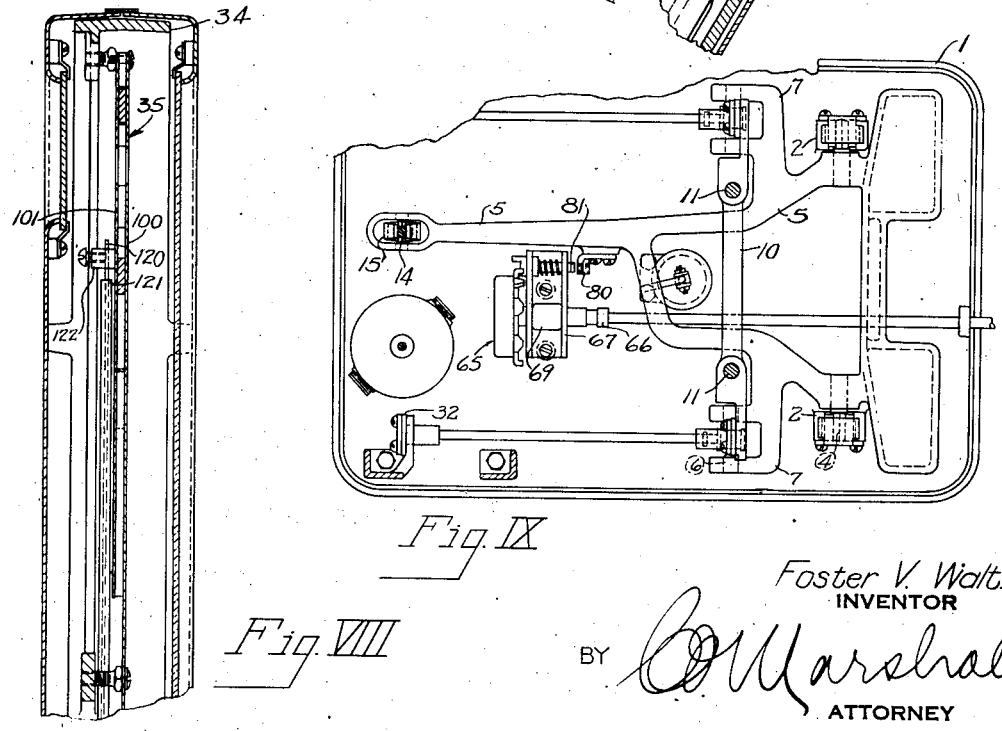
Foster V. Waltz
INVENTOR
ATTORNEY Patented Feb. 22, 1938

2,109,001

UNITED STATES PATENT OFFICE 2,109,001

WEIGHING SCALE

Foster V. Waltz, Toledo, Ohio, assignor to Toledo Scale Manufacturing Company, Toledo, Ohio, a corporation of New Jersey Application February 25, 1936, Serial No. 65,588

9 Claims. (Cl. 265—37)

This invention relates generally to weighing scales, and more particularly to scales, used in retail shops, having a comparatively low automatic weighing range and means for increasing said automatic weighing capacity several times.

The principal object of the invention is the provision of improved means for increasing the weighing capacity of a scale of the type hereinafter referred to.

Another object is the provision of improved means for visually indicating the weighing capacity.

Another object is the provision of means for changing characters on a weight indicating chart.

A still further object is the provision of improved means for actuating weighing capacity increasing means.

Yet another object is the provision of improved means for maintaining the condition of level of a load receiver.

These, and other objects and advantages will be apparent from the following description, in which reference is had to the accompanying drawings, wherein similar reference characters refer to similar parts throughout the several views.

In the drawings:—

Figure I is a front elevational view of a scale embodying my invention, the housing being broken away to more clearly show the mechanism.

Figure II is a side elevational view of the scale, the housing similarly being broken away.

Figure III is an enlarged, fragmentary view of the capacity increasing mechanism and portions of the actuating means.

Figure IV is an enlarged plan view of the mechanism shown in Figure III and seen substantially from along the line IV—IV of Figure III.

Figure V is a front elevational view of a resilient clutch as seen substantially from along the line V—V of Figure IV.

Figure VI is a sectional view of the mechanism shown in Figure V, it being sectioned along the line VI—VI of Figure V.

Figure VII is an enlarged fragmentary view, portions of the indicating chart and character changing device being broken away.

Figure VIII is a sectional view through the indicating chart seen substantially along the line VIII—VIII of Figure VII; and, Figure IX is a plan view of the base and mechanism of the scale mounted thereon, seen substantially from along the line IX—IX of Figure II.

Figure X is an enlarged fragmentary view seen substantially along the line X—X of Figure IV.

Referring to the drawings in detail:—

A base 1, preferably a rigid metallic casting, is provided with upstanding horns 2 having pockets in their upper ends in which bearings 3 are seated upon which fulcrumed pivots 4 of a lever 5 are oscillatively resting. In spaced relation to pivots 4, load pivots 6 are fixed in bifurcated arms 7 of the lever 5 from which stirrups 8 are suspended. Bearings in the lower portion of these stirrups 8 are engaged by pivots 9 fixed in a bifurcated portion of a platter frame 10; a portion of this frame 10 extends upwardly beyond the lever 5 and two studs 11, fixed in the upper portion of the frame 10 and extending through apertures in a base casing 12, support a load receiving platter 13. The opposite end of the lever 5 is bifurcated and the bifurcation is spanned by a nose pivot 14 which is engaged by a stirrup 15 suspended from a pivotally mounted disk 16 by means of a flexible metallic ribbon 17. The ribbon 17 overlies the face of the disk and is fastened to its periphery. A pivot 18 extends through the body of the disk 16 and is fastened therein and its extending ends are fulcrumed on bearings 19, seated in brackets 20 which are fastened to bosses on a frame 21, mounted on the base 1 and secured thereto by the bolts 22. Also secured to the pivot 18 is a sector 23 having an arcuate periphery, to the lower end of which is fastened a flexible metallic ribbon 24, whose upper end overlies and is fastened to the arcuate face of a power sector 25 which forms a part of a load counterbalancing pendulum 26. This pendulum comprises the aforementioned power sector 25, a body 27, a stem 28 fastened to the body 27, and a pendulum weight 29 adjustably mounted on the stem 28. The pendulum 26 is also provided with a pivot 30 which rests in bearings 31, seated in a horizontal portion of the frame 21. A chart frame 34 surmounts the frame 21 and supports a chart 35. This chart cooperates with an indicator 36 fastened to the pendulum body 27 of the pendulum 26 and partakes of its movement to indicate the weight of loads placed on the platter 13.

In place of the disk 16, two oppositely facing sectors may be employed, one for the purpose described and the other for a purpose which will hereinafter become clear. The arcuate faces of these sectors, as well as sector 23, may be so proportioned that the normal movement of the parts connected thereto may be respectively increased or decreased.

The condition of level of the platter 13 is obtained by the provision of a plurality of check links 38 and 39. The check link 38 pivotally engages the platter frame 10 above the pivot line of the lever 5 and the check links 39 engage the frame 10 at a distance below its point of suspension from the lever 5, the opposite ends of these check links 38 and 39 pivotally engage bearing blocks 32 which are rigidly attached in proper position to the frame 21. This method of guiding the platform is substantially similar to the one described in United States Patent No. 1,537,169 to H. O. Hem and I will not, therefore, describe it in greater detail.

Any type of check link, which is satisfactory in scale construction, may be used in the construction of the object of my invention; however, I prefer to employ the type shown in my copending application Serial No. 40,733.

The scale thus far described is adapted to weigh loads up to the capacity of its chart. One of the objects of the invention, however, is the provision of means for increasing the automatic weighing capacity by manipulative means. To accomplish this, the ribbon 17 which overlies one side of the periphery of the disk 16 to which it is fastened substantially in the center of the disk, continues to extend along its face and depend on the other side having a stirrup 40 fastened thereto. A weight hanger 41, which is in the form of a flat cup (see Figures III and IV), covered by a plate 42, has an upwardly extending stem 43 studded into its body. This stem 43 is threaded into the stirrup 40 so that the weight hanger 41 may be adjusted to the correct horizontal height. The cup of the hanger 41 is adapted to receive shot, or other weights, to float the mechanism, that is, to counterbalance a certain portion of the dead weight of the lever 5, frame 10 and the platter 13.

Two of the legs of the frame 21 have arms 44 and 45 which extend horizontally to substantially the vertical center line of the frame. These arms support perpendicularly positioned rods 46 and 47 respectively, extending upwardly from the base 1. Set screws 48 and 49, threaded through the arms 44 and 45 respectively, serve to hold the aforementioned rods 46 and 47 immovable. A sliding carriage 50, having a long horizontally extending leg 51 with apertures through which the rods 46 and 47 pass and a short leg 52 having an aperture through which the rod 46 passes, is movably mounted. A substantially C shaped frame 53, fastened to the arm 51 of the carriage 50 by the screws 54, has inwardly extending spool-like projections 55 from which a unit weight 56 is normally suspended, the suspension means being a pair of ears 57 and 58 having longitudinal slots which terminate in a V shaped bearing. Other spool-like studs 59 and 60, projecting outwardly from the unit weight 56, are adapted to engage ears 61 and 62 of another unit weight 63 in a similar manner.

The carriage 50, for the purpose of moving it upwardly or downwardly on the track rods 46 and 47, is connected by a thin flexible metallic cable 64 to a rotatable drum 65 which is mounted on a short hollow shaft 66 passing through apertures in a substantially U shaped bracket 67 bolted to the top faces of a pair of bosses 68 integral with the base casting 1. To hold the hollow shaft 66 and the thereupon mounted drum 65 against longitudinal movement a bushing 69 is circumjacently mounted on the shaft between the arms of the U shaped bracket 67 and clamped to the shaft by means of a set screw 70. To rotate the drum, an operating shaft 71 is inserted, from the exterior of the scale through apertures in the casing 12 and in a frame-like bracket 72, into the hollow portion of the short shaft 66 where it engages suitable gripping means; to rotate the shaft 71 a hand wheel 73 is affixed on that portion of the shaft 71 which extends on the exterior of the scale base casing 12. One end of the aforementioned thin, flexible, metallic cable 64 extends through a hole passing longitudinally through a screw 74 which is threaded through a shelf-like projection 75 of a member 76 fastened to the carriage 50. After passing around the periphery of the drum 65 the lower end of the cable is fastened to the short arm 52 of the carriage 50. The tension of this flexible cable 64, as can readily be seen, may be adjusted by the screw 74 since the end of the cable after passing through the aperture is secured to the head of the screw. A small bushing 77, which is threaded on the cable and fastened to it by solder, lies between the arms of a channel-like projecting portion 78 of the drum 65 which will hereinafter be more particularly described.

It has been found necessary by experience, and in fact weights and measures authorities of most countries require that a scale having unit weights as a partial load offsetting mechanism must be provided with means for locking or otherwise preventing the operation of the scale until the unit weights are in operative relation to the other weighing mechanism or entirely detached therefrom.

For holding the lever mechanism in an inoperative condition the scale embodying my invention is provided with a plate 80 (see Figs. IV and X) bolted to the lever 5 and the pointed end of a plunger 81 is adapted to enter notches cut in an arcuate face of the plate 80 to hold the lever inoperative during the movement of one or both of the unit weights 63 or 56 to the "on" or "off" position or vice versa. The plunger 81 whose one end is adapted to lock the lever 5 during the manipulation of the unit weights is punched from sheet steel and comprises a comparatively narrow rectangular portion and a comparatively wide rectangular portion 82 and is mounted for reciprocating movement in suitable apertures in the flanges of the bracket 67. The relatively wide rectangular section has a finger-like extension 83, which under the urge of a spring 85, encircling a portion of the plunger and pressing against a shoulder formed by the junction of the narrow and wide portions and one of the flanges of the U shaped member 67, enters one of the slots 84 cut in the vertical leg of the carriage 50 simultaneously releasing the lever mechanism by withdrawing from the notched face of the plate 80 and holding the carriage 50 and the unit weights 56 and 63 in predetermined position either detached from the weighing mechanism of the scale or definitely in operative relation to the scale.

The plunger 81 and the unit weight mechanism are manipulated by turning the handwheel 73 in either a clockwise or anticlockwise direction, depending upon the position of the unit weights.

As readily seen, the plunger 81 is synchronously actuated with the unit weight mechanism to alternately lock the lever mechanism when unit weights are being shifted and to unlock the lever mechanism and lock the unit weight carriage when the unit weights have been placed in their desired positions.

The rotatable drum 65, which actuates the unit weight carriage, is yieldingly attached to an actuating plate 86 (see Figs. V and VI). This actuating plate 86 is provided with beveled projections 87, 88, and a stop 89; these are provided, respectively to actuate the plunger 81 and to prevent the unit weight mechanism from being put under a strain which might influence the accuracy of the device. It also has a centrally located boss 90 into which the short shaft 66 is studded, also forming a trunnion upon which the drum 65 is mounted. An inwardly projecting boss 92 in the interior of the drum 65 forms an abutment engaged by the ends of springs 93 and 94 lying in a trough-like depression in the interior of the drum. The other ends of these springs 93 and 94 press against opposite sides of a boss 95 projecting inwardly from the plate 86. A shaped annular boss 96 on the plate 86 prevents the springs 93 and 94 from being displaced. Two shoulder screws 91 passing through curved slots in the face of the drum 65 and threaded into thickened portions of the annular boss 96, loosely hold the drum 65 to the plate 86.

The indicating mechanism of the scale comprises a relatively movable graduated chart 35 and index hand 36 respectively. The index hand 36 is fastened to the body 27 of the pendulum 26 and the graduated chart 35 is securely fixed to the cast frame 34 which is erected upon the frame 21.

For the purpose of indicating, at all times, the capacity weight of the scale as influenced by the unit weights I have provided a mechanism which simultaneously changes weight indicating characters of the indicating means when unit weights are placed on or removed from the weighing mechanism. The graduated means 35 comprise a front chart 100 and a back chart 101 and a series of formed spacers 102 and 103. The spacers 102 and 103 are so designed and shaped as to form a curved slot 104 in each of the upper corners, each of the slots having a downwardly, tangential extension in which slides 105 and 106 are located. Substantially horizontal curvilinear extensions of the slot 104 formed by the spacers 102 and 103, support the ends of a rigid arcuate member 107. A plurality of disk-like members 108, 109, 110, 111, and 112, 113, 114, 115 are interposed between the ends of the arcuate member 107 and the upper ends of the sliding members 105 and 106 respectively. An equal armed lever 116 is fulcrumed on a stud 117, which is fixed in the chart 101. The ends of this lever 116 have finger-like projections which extend into slots cut into projecting portions 118 and 119 of the slides 105 and 106 respectively. The slide 106 is directly connected to the unit weight carriage 50 by means of a stiff flexible wire 120, extending through a tube 121 formed from coiled wire, which readily conforms itself to the contours of other parts to which it is fastened and thus it is adapted to satisfactorily guide the wire 120. A pin 122 fixed in the slide 106 and extending through a suitable slot 123 in the chart 101 is provided with means to clamp the upper end of the wire 120. The lower end of this wire is clamped in a similar pin 124 fixed in and extending laterally from a motion reducing lever 125 fulcrumed on a shoulder screw 126, threaded into an arm 127 extending from the frame 21. The free end of the lever 125, which is preferably punched from sheet metal, is slotted and straddles a shoulder of a screw 128 threaded into the end of a laterally extending pin 129, riveted in the member 76 of the carriage 50, thus any movement of the carriage 50 forces the slide 106 to move a proportional distance in the slot 104. An upward movement of the carriage 50, due to the particular operative relation of the parts described, supra, causes the upper end of the slide 106 to force the disks 115, 114, 113, and 112 to follow the curvilinear path of the slot and force the arcuate member 107 to partake of this movement. The disks 108, 109, 110, and 111 stationed in curvilinear track 104 in the opposite corner of the indicating means are forced downwardly against the top of the slide 105. Since this slide 105, however, is coupled to the slide 106 through the even armed lever 116 in such a manner that it moves an equal distance but in the opposite direction, the slides, 105 and 106, the disks 108—115 and the arcuate member 107 therefore move as a unit and proper weight numerals 130 marked on the disks and the arcuate member 107 invariably appear in openings 131 in the charts 100 and 101.

In operation, when there are no unit weights cooperating with the automatic weighing mechanism and no load is on the platter 13, the numerals 0, 1, 2, 3, 4, and 5 appear in the openings 131 in the charts 100 and 101, and the index hand registers with the graduation marked zero. When a load, weighing, for example, 3 lbs. 8 oz., is placed on the platter it depresses the lever 5 and force is transmitted through the ribbon 17 to the disk 16; this disk 16 turns on its pivot 18, in a clockwise direction, and the force is transmitted to the pendulum 26 through the ribbon 24 which connects the sector 23 also seated on the pivot 18, and the sector 25 of the pendulum 26. The pendulum 26 under the influence of this force moves outwardly and upwardly through an angle proportional to the weight i. e., until its weight moment counterbalances the load on the platter. The index hand 36 moves with the pendulum and points to the proper weight indicia on the chart.

When a load, weighing in excess of the automatic weighing capacity, is placed on the platform the pendulum 26 swings through its maximum angle and the index hand 36 comes to rest at a point beyond the maximum weight indicia. The operator then turns the handwheel 73. This motion is transmitted by means of the shafts 71 and 66 to the plunger actuating plate 86 and to the thereto attached unit weight actuating drum 65 and the beveled projection 87 on the plate 86 contacts the relatively wide rectangular section of the plunger 81 projecting beyond the flange of the bracket 67 and forces this against the urge of the spring 85 so that the finger-like projection 83 is withdrawn from one of the slots 84 in the vertical leg of the carriage 50 and the opposite beveled end of the plunger 81 is forced into one of the notches in the arcuate face of the plate 89 and holds the lever, and thus all of the weighing mechanism, in an inoperative condition. Since the carriage 50 is held against all movement by the finger projection 83 of the plunger 81 the drum 65 is also held stationary. Since the cable 64, which passes around the drum, and has its ends fastened to the carriage 50, is unyielding, the springs 93 and 94 in the interior of the drum absorb the movement of the plate 86. When the finger-like projection 83 of the plunger 81 has been entirely withdrawn from out of the slot 84 further movement of the plate 86 causes rotation of the drum 65 and with the cooperation of the cable 64 the carriage 50 is lowered and the unit weight 63 is deposited on the weight hanger plate 42. Additional movement of the frame 50 takes place until the ears 61 and 62 are entirely disengaged from the spool-like studs 59 and 60 fixed in the unit weight 56 from which the unit weight 63 heretofore has been suspended. The weight of the unit weight 63, now resting on the weight hanger 41, exerts a force in opposition to the force exerted by the load on the platter, through the stirrup 40 and the disk 16 and counterbalances an amount of load on the platter 13 that is equal to the automatic counterbalancing capacity of the scale. The disk 16 thereby turning in anticlockwise direction on its pivot 18 and by the cooperation of the sector 23 and the ribbon 24 permits the pendulum weight 29 to move downwardly until its weight moment balances the remainder of the weight of the load and the index hand 36 points to the proper weight indicia on the charts 100 and 101. The amount of weight which is being counterbalanced by the unit weight is automatically indicated.

When the carriage 50 is moved downwardly the shoulder screw 128, forming a part of the carriage 50 and passing through the slotted end of the lever 125, forces this lever 125 to partake of its movement. The stiff, flexible wire which is clamped to the lever 125 and to the slide 106 causes this slide 106 also to move in a downwardly direction and through the even-armed lever 116 causes the slide 105 to push upwardly against the disks 111, 110, 109, 108 and against the arcuate member 107 causing these parts to slide in the slot 104 until the nearest indicia 130 is stationed in back the openings 131.

Should a load be placed on the platter 13 which is in excess of the automatic weighing capacity and the offsetting capacity of the unit weight, the unit weight 56 may be lowered unto the weight hanger 41 by repeating the operation just described.

When the unit weight 56 has been deposited on the hanger the stop 89 contacts the rectangular portion of the plunger 81 in such a manner to prevent a strain from being exerted on the unit weight mechanism.

The removal of the unit weights 56 and 63 from the weight hanger 41 is accomplished by turning the handwheel 73 in an anticlockwise direction.

The embodiment of my invention herein shown and described is to be regarded as illustrative only and it is to be understood that the invention is susceptible to variation, modification and change within the spirit and scope of the subjoined claims.

Having described my invention, I claim:

1. In a device of the class described, in combination, weighing mechanism comprising a lever, a load receiver mounted upon said lever, a load counterbalance, means for operatively connecting said lever and said load counterbalance, said connecting means comprising a rockably mounted means, metallic ribbons extending between said rockably mounted means and said lever, and between said rockably mounted means and said load counterbalance, and a metallic ribbon, secured to said rockably mounted means, having a weight suspended therefrom to substantially counterbalance the dead weight of said lever and said load receiver.

2. In a device of the class described, in combination, weighing mechanism comprising load receiving means, automatic load counterbalancing means operatively connected thereto, load indicating means actuated by said automatic load counterbalancing means, a manipulative load counterbalancing mechanism for supplementing the capacity of said automatic load counterbalancing means and means for operatively connecting said manipulative load counterbalancing mechanism and said automatic load counterbalancing means, said connecting means comprising a rotatable member and flexible means extending between said automatic load counterbalancing means and between said rockable member and said manipulative load counterbalancing means.

3. In a device of the class described, in combination, weighing mechanism comprising automatic load offsetting means, manipulative load offsetting means adapted to cooperate therewith, means for manipulating said last mentioned load offsetting means, said means including a pair of guide rods, a frame movably mounted upon said guide rods, load offsetting weights normally suspended from said frame in noncooperative condition, means for placing said weights in a cooperative condition, said means comprising a rotatable member, means for rotating said rotatable member and flexible means attached to said rotatable member and to said carriage to move said carriage upon movement of said rotatable member.

4. In a device of the class described, in combination, weighing mechanism comprising automatic load offsetting means, manipulative load offsetting means adapted to cooperate therewith, means for manipulating said last mentioned offsetting means, said means including a pair of guide rods, a frame movably mounted on said guide rods, load offsetting weights suspended from said frame in a normal nonoperative condition, means for placing said load offsetting weights in a cooperative condition, said means comprising a shaft, a drum mounted upon said shaft and a cable wound about said drum and having its ends secured to said frame whereby said frame may be moved in one direction when said shaft is turned and in another direction when said shaft is turned in the opposite direction.

5. In a device of the class described, in combination, weighing apparatus comprising automatic load offsetting mechanism having a pendulum controlled indicating means, manipulative load counterbalancing mechanism to manipulatively supplement the offsetting capacity of said automatic load counterbalancing mechanism, means for simultaneously influencing said weight indicating means upon actuation of said manipulative load offsetting mechanism, said indication influencing means including a plurality of indicia bearing disk-like members arranged in queue formation, a guide means, and means controlled by said manipulative load counterbalancing mechanism for moving said indicia bearing members along said guide.

6. In a device of the class described, in combination, weighing apparatus comprising automatic load offsetting mechanism having a pendulum controlled indicating means, manipulative load counterbalancing mechanism to manipulatively influence the offsetting capacity of said automatic load counterbalancing mechanism, means for simultaneously influencing said weight indicating means upon actuation of said manipulative load offsetting mechanism, said indication influencing means including a curvilinear track, a plurality of indicia bearing, disk like members positioned in queue formation within said curvilinear track and means for alternately exerting pressure to the ends of such queue formation of disks to vary their positions.

7. In a device of the class described, in combination with automatic load counterbalancing mechanism and auxiliary load counterbalancing mechanism to influence said automatic load counterbalancing mechanism, indicating means comprising a pair of relatively movable charts and indicator to indicate the weight of load counterbalanced by said automatic load counterbalancing mechanism, said charts being spaced from each other, and indicating means mounted in such space between said charts comprising a curvilinear track and a plurality of indicia bearing members positioned in queue formation within said track, cooperatively connected to said auxiliary load counterbalancing mechanism, to modify the indication proportionally to the modifying influence exerted by said auxiliary load offsetting mechanism.

8. In a device of the class described, in combination, weighing mechanism comprising automatic load counterbalancing mechanism, indicating means to indicate weight of loads offset by said automatic load counterbalancing mechanism, manipulative load counterbalancing mechanism, indicating means cooperating with said means for indicating the weight of loads offset by said automatic load counterbalancing mechanism to modify such weight indication proportionally to the extent that said automatic load counterbalancing mechanism is influenced by said manipulative load counterbalancing mechanism, said indicating mechanism comprising front and back charts bearing weight graduations, having openings positioned in coincidence with graduations on said chart representing integral units of weight, spacers between said front and back charts forming a channel, a plurality of movable numeral bearing members stationed within said channel and means including an even armed pivotally mounted lever, cooperatively connected to said manipulative load counterbalancing mechanism, to position such numeral bearing members in the openings in said chart to visually indicate the weight of loads counterbalanced by the cooperation of said automatic load counterbalancing mechanism and said manipulative load counterbalancing mechanism.

9. In a device of the class described, in combination, weighing mechanism comprising automatic load counterbalancing mechanism, indicating means to indicate weight of loads offset by said automatic load counterbalancing mechanism, manipulative load counterbalancing mechanism, indicating means cooperating with said means for indicating the weight of loads offset by said automatic load counterbalancing mechanism to modify such weight indication proportionally to the extent that said automatic load counterbalancing mechanism is influenced by said manipulative load counterbalancing mechanism, said indicating mechanism comprising front and back charts bearing weight graduations, having openings positioned in coincidence with graduations on said chart representing integral units of weight, spacers between front and back charts forming a channel, a plurality of movable numeral bearing members stationed within said channel and means including an even armed pivotally mounted lever, cooperatively connected to said manipulative load counterbalancing mechanism, to position such numeral bearing members in the openings in said chart to visually indicate the weight of loads counterbalanced by the cooperation of said automatic load counterbalancing mechanism and said manipulative load counterbalancing mechanism, said means connecting said even armed pivotally mounted lever and said manipulative load counterbalancing lever including a flexible tube and a relatively flexible but stiff wire within said flexible tube.

FOSTER V. WALTZ.